(12) United States Patent
Zigmond et al.

(10) Patent No.: US 9,292,515 B1
(45) Date of Patent: Mar. 22, 2016

(54) USING FOLLOW-ON SEARCH BEHAVIOR TO MEASURE THE EFFECTIVENESS OF ONLINE VIDEO ADS

(71) Applicant: Google Inc., Mountain View, CA (US)

(72) Inventors: Daniel John Zigmond, Menlo Park, CA (US); Maksim Pashkevich, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 313 days.

(21) Appl. No.: 13/833,327

(22) Filed: Mar. 15, 2013

(51) Int. Cl.
*G06F 17/30* (2006.01)
*G06Q 30/02* (2012.01)

(52) U.S. Cl.
CPC ...... *G06F 17/30029* (2013.01); *G06Q 30/0242* (2013.01)

(58) Field of Classification Search
CPC .......... G06Q 30/0242; G06Q 30/0251; G06Q 30/0277; G06Q 17/30029
USPC ........... 707/749, 758; 705/14.4, 14.41, 14.54, 705/14.66
See application file for complete search history.

(56) References Cited

U.S. PATENT DOCUMENTS

| 7,685,191 | B1 | 3/2010 | Zwicky et al. | |
| 8,386,311 | B2 * | 2/2013 | Park | G06Q 30/02 705/14.4 |
| 2007/0260519 | A1 * | 11/2007 | Sattley | G06Q 30/02 705/14.41 |
| 2008/0133342 | A1 | 6/2008 | Criou et al. | |
| 2008/0255904 | A1 * | 10/2008 | Park | G06Q 30/02 705/14.45 |
| 2010/0088716 | A1 * | 4/2010 | Ellanti | H04N 5/85 725/32 |
| 2010/0145777 | A1 | 6/2010 | Ghosh et al. | |
| 2010/0185512 | A1 | 7/2010 | Borger et al. | |
| 2011/0119126 | A1 * | 5/2011 | Park | G06Q 30/02 705/14.45 |
| 2011/0307331 | A1 | 12/2011 | Richard et al. | |
| 2011/0320263 | A1 | 12/2011 | Yamada | |
| 2012/0123854 | A1 | 5/2012 | Anderson et al. | |
| 2013/0173379 | A1 * | 7/2013 | Park | G06Q 30/02 705/14.41 |

FOREIGN PATENT DOCUMENTS

| JP | 2002-135757 | 5/2002 |
| WO | WO-01-37183 | 5/2001 |

OTHER PUBLICATIONS

Davidaviciene, Vida "Effective Factors of Online Advertising", http://leidykla.vgtu.lt/conferences/BM_2012/information_and_communication/822_830_Davidaviciene.pdf, 2012.

* cited by examiner

*Primary Examiner* — Phong Nguyen
(74) *Attorney, Agent, or Firm* — Lowenstein Sandler LLP

(57) ABSTRACT

An advertisement effectiveness module determines a search lift value for each of a plurality of impressions of an advertisement. The search lift value is based on a relevancy of user searches before and after each advertisement impression. The advertisement effectiveness module calculates a first average search lift value for a subset of the plurality of impressions delivered in a first format and a second average search lift value for the subset of the plurality of impressions delivered in a second format. The advertisement effectiveness module compares the first average search lift value to the second average search lift value to determine an effectiveness of the first format and the second format.

21 Claims, 5 Drawing Sheets

USING FOLLOW-ON SEARCH BEHAVIOR TO MEASURE THE EFFECTIVENESS OF ONLINE VIDEO ADS

TECHNICAL FIELD

This disclosure relates to the field of on-line advertising and, in particular, to using search behavior to measure advertisement effectiveness.

BACKGROUND

Digital media includes multimedia, such as video and audio content, which is received by and presented to an end-user on a user device, such as a computer, smartphone, etc. The digital media may be presented from a content provider over a network, such as the Internet, and may be referred to as "on-line media content." Much on-line media content is offered to users free of charge and subsidized through on-line advertising. On-line advertising includes in-stream advertising, such as video advertisements that appear before, during and/or after on-line media content (e.g., Internet videos). These video advertisements, which are similar to television commercials, may appear, for example, before the Internet video is played and may typically last 15 to 30 seconds.

The effectiveness of a particular advertisement is one metric used to determine the cost or value of the advertisement. The effectiveness typically measures how much of an effect the advertisement has on the viewer (i.e., whether it influences their feelings toward the advertised product). The effectiveness of television commercials and on-line video advertisements is conventionally measured using brand awareness surveys. The advertiser typically designs a questionnaire related to the advertisement and manually administers the survey to selected viewers. The selected viewers then manually answer the questionnaire and return the results to the advertiser or survey administrator. This manual process can be time-consuming, expensive and the results may not be a reliable indicator of the advertisement's true effectiveness.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, an advertisement effectiveness module determines a search lift value for each of a plurality of impressions of an advertisement. The search lift value is based on a relevancy of user searches before and after each advertisement impression. In order to determine the search lift value, the advertisement effectiveness module compares search terms in a user search to one or more keywords associated with the advertisement to determine a relevancy score. The relevancy score may include a percentage of the one or more keywords that are present in the search terms of the user search. The advertisement effectiveness module determines a first representative relevancy score for user searches from a period before a first impression of the advertisement and determines a second representative relevancy score for user searches from a period after the first impression of the advertisement. The advertisement effectiveness module then compares the first representative relevancy score to the second representative relevancy score. In one implementation, the first representative relevancy score comprises a maximum relevancy score from the period before the first impression and the second representative relevancy score comprises a maximum relevancy score from the period after the first impression. If the second representative relevancy score is greater than the first representative relevancy score, the advertisement effectiveness module sets the search lift value equal to one, and otherwise to zero.

In one implementation, the advertisement effectiveness module calculates a first average search lift value for a subset of the plurality of impressions delivered in a first format and a second average search lift value for the subset of the plurality of impressions delivered in a second format. The first format may include, for example, a non-skippable advertisement and the second format may include a skippable advertisement. The advertisement effectiveness module compares the first average search lift value to the second average search lift value to determine an effectiveness of the first format and the second format.

BRIEF DESCRIPTION OF THE DRAWINGS

The present disclosure is illustrated by way of example, and not by way of limitation, in the figures of the accompanying drawings.

DETAILED DESCRIPTION

Implementations are described for using search behavior to measure advertisement effectiveness. In one implementation, the relevance of a user's searches before being shown a video advertisement (i.e., an ad impression) are compared to the relevance of the user's searches after being shown the video advertisement. If the relevance of the searches with respect to the content of the advertisement increases after being shown the video advertisement, it is likely that the advertisement had some effect on the user. The determination of whether or not the advertisement had some effect on the user can be particularly useful when comparing different formats of the same video advertisement. For example, the advertisement may be shown to some users as a non-skippable video advertisement, while other users may see a skippable version. In one implementation, the non-skippable video advertisement is played all the way through to completion before some other media file (e.g., an Internet video) is played. The skippable version however, may provide the user with the ability to end the video advertisement after some period of time (e.g., 5 seconds) and go straight to the other media file. It may be the case, that the skippable format has the same or similar effectiveness and the non-skippable version (measured in terms of eliciting a response from the user), while increasing user satisfaction because the user need not wait for the entire advertisement to complete if it is not something that interests the user.

The techniques described herein for using search behavior to measure advertisement effectiveness provide a completely passive approach to comparing the effectiveness of different advertisement formats. The relative relevancy of the user searches is likely indicative of the effectiveness of the video advertisement and can be measured without any manual steps from the advertiser or user, besides what they would do in the normal course of operations. The user search behavior can be passively measured and analyzed (i.e., the user need not actively input information indicating a response to the advertisement) to determine the effectiveness of the video advertisement. The effectiveness of the advertisement can be used for a number of purposes including for example, determining an appropriate pricing structure for the advertisement and determining what advertisements a user may find interesting.

Figure 1:
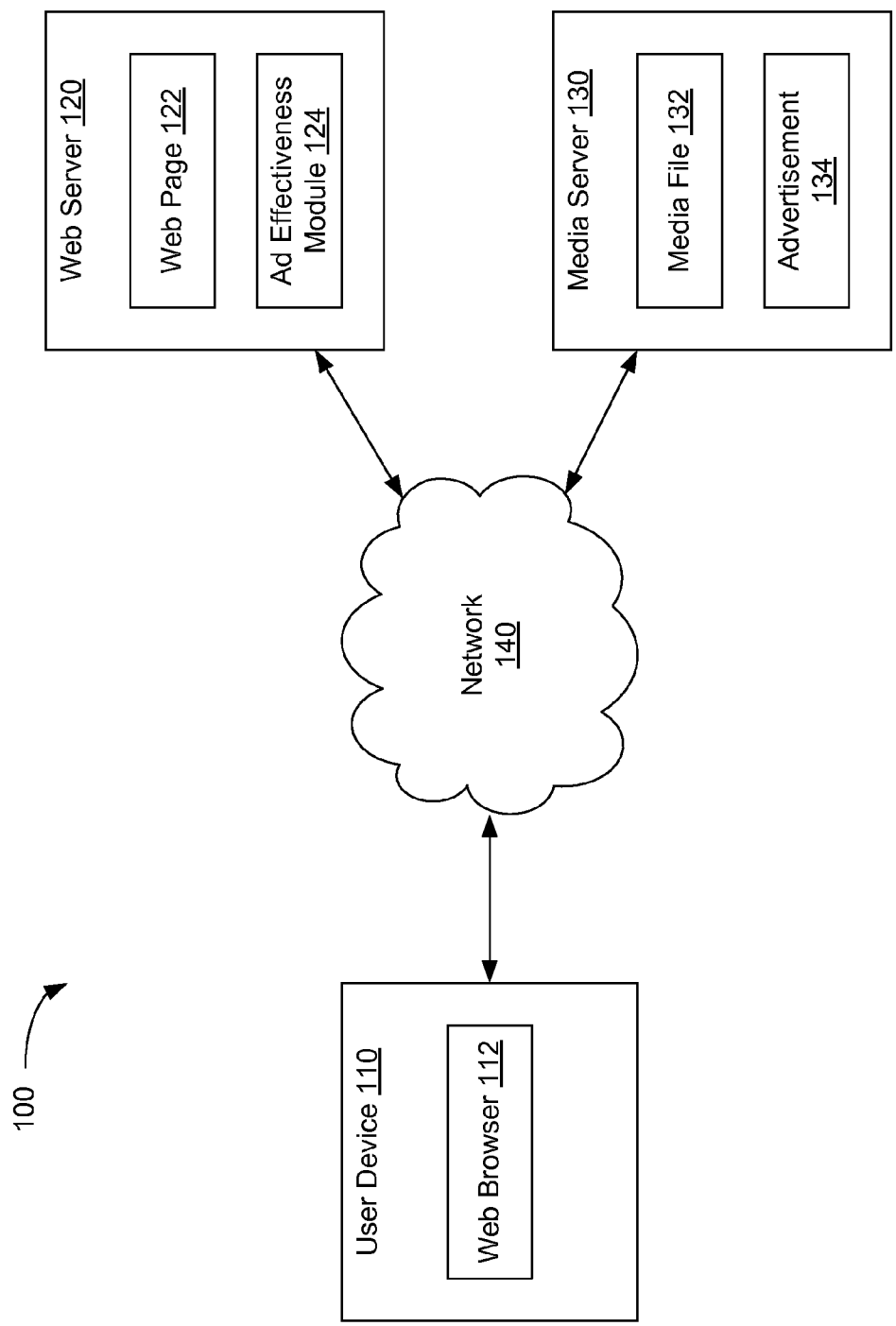
FIG. 1 is a block diagram illustrating an exemplary network architecture in which implementations of the present disclosure may be implemented.

FIG. 1 is a block diagram illustrating an exemplary network architecture in which implementations of the present disclosure may be implemented. The network architecture 100 can include one or more user devices 110 communicating with one or more servers, such as web server 120 and media server 130 over one or more networks 140, according to one implementation. Network 140 can be a local area network (LAN), a wireless network, a telephone network, a mobile communications network, a wide area network (WAN), such as the Internet, or similar communication system. User device 110 may be any type of computing device including a server computer, gateway computer, desktop computer, laptop computer, mobile communications device, cell phone, smart phone, hand-held computer, tablet computer, or similar computing device. User device 110 may be variously configured with different features to enable viewing of multimedia content, such as images, videos, songs, etc.

Web server 120 and media server 130 may include a network-accessible server-based functionality, various data stores, and/or other data processing equipment. The servers 120 and 130 may be implemented by a single machine or a cluster of machines. As illustrated in FIG. 1, web server 120 and media server 130 are separate devices. In another implementation, however, web server 120 and media server 130 may be combined into a single machine or device. One or both of web server 120 and media server 130 may be hosted, for example, by computer system 500 of FIG. 5. In one implementation, web server 120 hosts web page(s) 122. Web server 120 can deliver web page(s) 122 to user device 110 or another client device using for example the Hypertext Transfer Protocol (HTTP). Web page(s) 122 may be part of, for example, a media content hosting website that allows users to upload, view and share, multimedia content.

In one implementation, media server 130 includes one or more media files 132 and one or more video advertisements 134. Media file 132 may represent the audio and video content (e.g., an Internet video) that a user plays through web page 122. For example, when a user of user device 110 views web page 122, using a web browser 112 or other program running on user device 110, and requests to view a certain multimedia content, web server 120 can send a message to media server 130 requesting media file 132. Media server 130 can initiate the streaming or download of media file 132 to user device 110 via network 140. In one implementation, media file 132 is a music video file, including both a visual and an audio component. In other implementations, however, media file 132 may be some other type of media file.

In one implementation, in addition to transferring media file 132, media server 130 may also transfer advertisement 134. Advertisement 134 may be, for example, an in-stream video advertisement that is played before, during or after media file 132. Advertisement 134 may be in one of a number of formats, such as a non-skippable video advertisement or a skippable version. In one implementation, the non-skippable video advertisement is played all the way through to completion before media file 132 is played. The skippable version may provide the user with the ability to end the video advertisement after some period of time (e.g., 5 seconds) and go straight to the media file 132. In other implementations, advertisement 134 may have some other format, including for example, a static non-video advertisement, a text advertisement, a rich-media advertisement, or some other format.

In one implementation, web server 120 also includes ad effectiveness module 124. Ad effectiveness module 124 can use search behavior to measure the effectiveness of advertisement 134. In one implementation, ad effectiveness module 124 compares the relevance of a user's searches input into web browser 112 before being shown video advertisement 134 to the relevance of the user's searches after being shown the video advertisement 134. If the relevance of the searches with respect to the content of the advertisement 134 increases after being shown the video advertisement 134, it is likely that the advertisement 134 had some effect on the user. The determination of whether or not the advertisement had some effect on the user can be particularly useful when comparing different formats of the same video advertisement. In other embodiments, ad effectiveness module 124 can run on some other server, such as media server 130, or on some other separate computing device. Some implementations of ad effectiveness module 124 are discussed in more detail below.

Figure 2:
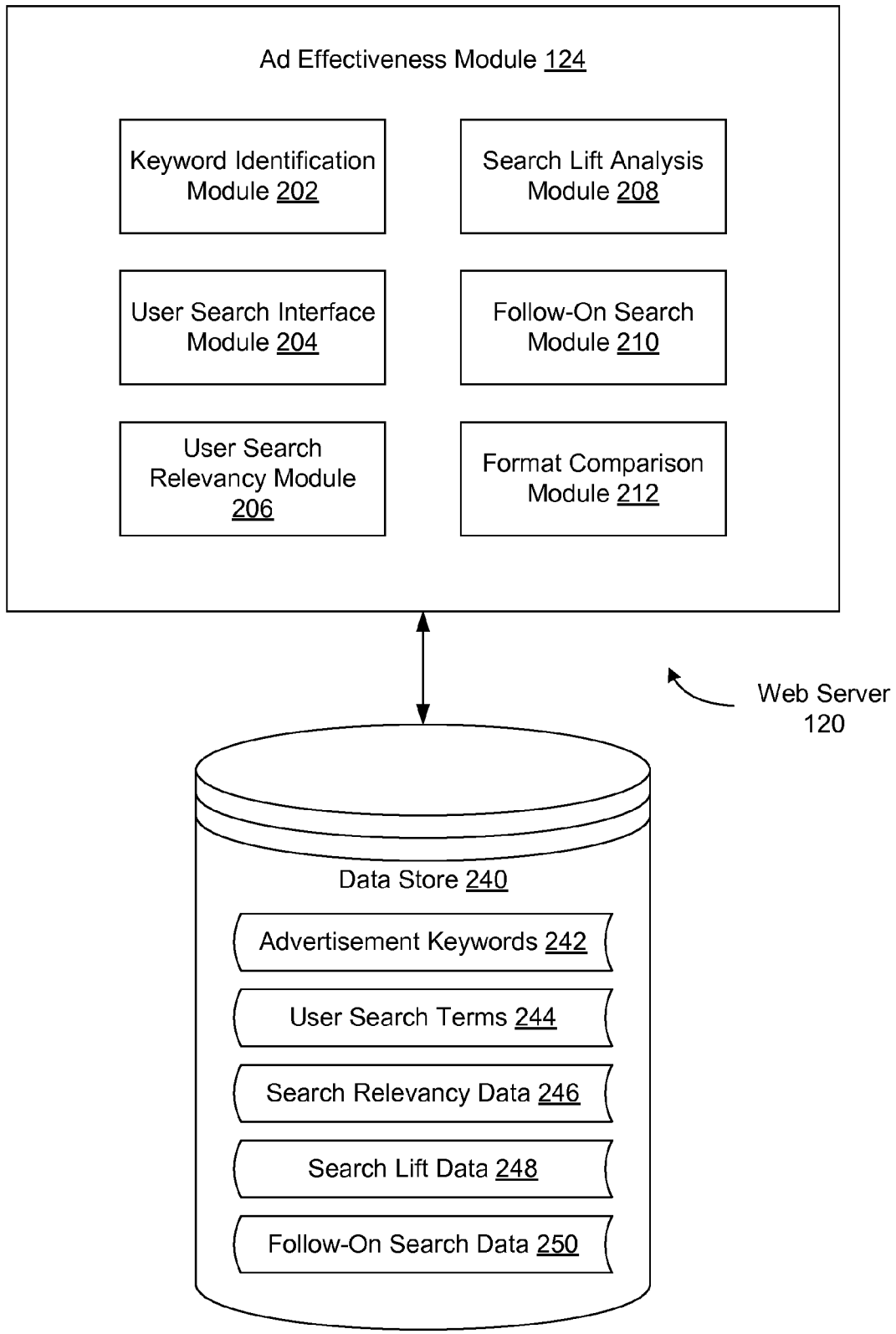
FIG. 2 is a block diagram illustrating an advertisement effectiveness module for determining the effectiveness of an advertisement based on user search behavior, according to some implementations.

FIG. 2 is a block diagram illustrating an ad effectiveness module 124 for using search behavior to determine advertisement effectiveness, according to some implementations of the present disclosure. In one implementation, ad effectiveness module 124 includes keyword identification module 202, user search interface module 204, user search relevancy module 206, search lift analysis module 208, follow-on search module 210 and format comparison module 212. This arrangement of modules may be a logical separation, and in other implementations, these modules or other components can be combined together or separated in further components, according to a particular implementation. In one implementation, storage device 240 is connected to ad effectiveness module 124 and includes advertisement keywords 242, user search terms 244, search relevancy data 246, search lift data 248 and follow-on search data 250. In one implementation, web server 120 may include ad effectiveness module 124 and storage device 240. In another implementation, storage device 240 may be external to web server 120 and may be connected to web server 120 over a network or other connection. In other implementations, web server 120 may include different and/or additional components which are not shown to simplify the description. Storage device 240 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, keyword identification module 202 identifies keywords used to describe a video advertisement, such as advertisement 134. In one implementation, the advertiser who created the advertisement 134 provides a title or description of the advertisement. Keyword identification module 202 may parse the title or description to identify individual words. In one implementation, keyword identification module 202 may remove commonly used words or other non-descriptive words. Keyword identification module 202 may store the remaining words as advertisement keywords 242. For example, if the provided title of the advertisement 134 was "Automobile advertisement for new model from manufacturer X in 2013," keyword identification module 202 may identify keywords "automobile," "advertisement," "new," "model," "manufacturer X," and "2013" and store them as advertisement keywords 242. The words "for," "from," and "in" may be discarded as commonly used non-descriptive words. In one implementation, keyword identification module 202 may also identify synonyms or other words related to the description, such as "car" or "commercial" and add them to advertisement keywords 242.

In other implementations, keyword identification module 202 may identify advertisement keywords 242 in some other manner. For example, keyword identification module 202 may use natural language processing or speech-to-text techniques to identify the keywords from the audio portion of the advertisement 134. Keyword identification module 202 may also use character recognition techniques to identify the keywords from text that appears in the advertisement 134. In another implementation, keyword identification module 202 may access a set of keywords 242 corresponding to the advertisement 134 that were manually generated by the advertiser or by some other human operator.

In one implementation, user search interface module 204 reviews logs of user search data to identify user search terms 244. In one implementation, user search interface module 204 reviews user searches from a set period of time (e.g., 12 hours) before and after a particular ad impression (i.e., when an instance of the video advertisement 134 is displayed for the user), from the same calendar day as the ad impression, or a set number (e.g., 20) of user search queries from before and after the ad impression. In one implementation, the user searches that are reviewed may be searches made specifically in web page 122. In other implementations, however, the searches may be from other web pages and/or websites accessed in web browser 112 or other programs. User search interface module 204 may store the identified searches as user search terms 244.

In one implementation, user search relevancy module 206 determines a relevancy score for each of the user searches identified by user search interface module 204. User search relevancy module 206 may compare the user search terms 244 from each separate search to the advertisement keywords 242 for a particular advertisement 134. In one implementation, user search relevancy module 206 looks for exact matches between the user search terms 244 and the advertisement keywords 242. In other implementations, however, user search relevancy module 206 may detect partial matches (e.g., based on the root of the keywords or to account for plurals). User search relevancy module 206 may calculate a relevancy score based on what percentage of the advertisement keywords 242 are matched in a particular user search string. For example, if there are six advertisement keywords 242 describing the advertisement 134 and three of those keywords are found in the user search terms 244 for a particular search, the relevancy score for that search would be 50% or 0.50. User search relevancy module 206 may determine a relevancy score for each search identified by user search interface module 204 in the periods before and after the ad impression and store the relevancy scores as search relevancy data 246.

In one implementation, search lift analysis module 208 determines a representative relevancy score from the period before the ad impression and from the period after the ad impression. In one implementation, the representative relevancy score may be the highest or maximum relevancy score from the period. In another implementation, the relevancy scores may be weighted based on their proximity in time to the ad impression. For example, the relevancy scores of searches occurring immediately after the ad impression may be weighted higher than searches occurring after some period of time. In other implementations, the representative relevancy score may be an average or a weighted average of the scores from the same period.

Search lift analysis module 208 may compare the representative relevancy score from the period before the ad impression to the representative relevancy score from the period after the ad impression to determine a search lift value. In one implementation the search lift value is a binary indicator of an increase in search relevancy after the ad impression. Thus, if the representative relevancy score from the period after the ad impression is greater than the representative relevancy score from the period before the ad impression, the search lift value is 1 (or some other representative value). Otherwise, the search lift value is 0 (or some other representative value). In another implementation, the representative relevance score should increase by a threshold amount (e.g., 25%) in order for search lift analysis module 208 to determine a search lift value of 1. In still other implementations, the search lift value may not be a binary indicator, but rather a percentage change in the representative relevancy scores. Search lift analysis module 208 may store the search lift value for each ad impression as search lift data 248 in data store 240.

In one implementation, follow-on search module 210 determines a follow-on search score for one format of the advertisement 134 based on the search lift values for each ad impression in that format. For example, if an advertisement is shown in a non-skippable format 200 times (i.e., 200 separate ad impressions), search lift data 248 should include 200 search lift values (i.e., one for each ad impression). Follow-on search module 210 may calculate an average of those 200 search lift values, which may be referred to as the follow-on search score for the non-skippable format of advertisement 134. Follow-on search module 210 may also calculate the average of the search lift values from each ad impression of a skippable version of the same advertisement 134. Follow-on search module 210 may store the follow-on search score from each format as follow-on search data 250.

In one implementation, format comparison module 212 can compare the follow-on search values from follow-on search data 250 to measure the effectiveness of the varying advertisement formats. For example, if the follow-on search score for one format (e.g., non-skippable) is significantly higher, this may indicate that that format is more effective in reaching users. Also, if the follow-on search scores are similar across multiple formats, this may indicate that the particular format of the advertisement is not important in reaching users. Additional analysis of the follow-on search data 250 may also be performed by format comparison module 212, by other software programs, or by human analysts to measure the effectiveness of the advertisements.

Figure 3:
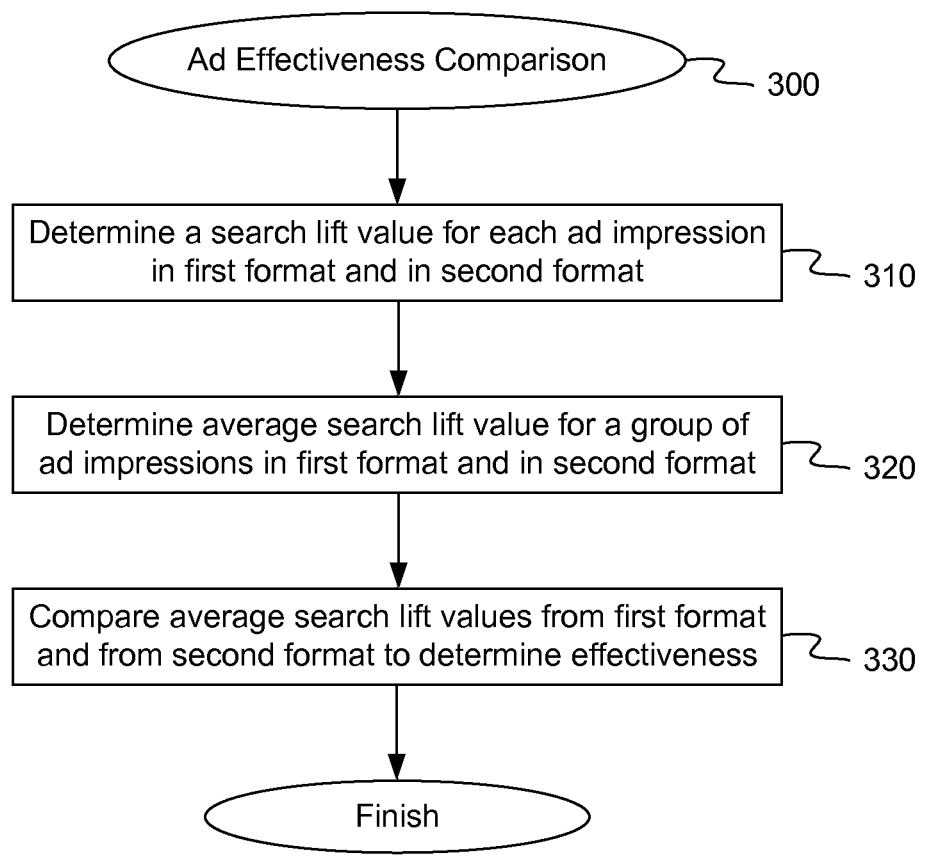
FIG. 3 is a flow diagram illustrating a method for comparing the effectiveness of an advertisement in varying formats, according to some implementations.

FIG. 3 is a flow diagram illustrating a method for comparing the effectiveness of an advertisement in varying formats, according to some implementations. The method 300 may be performed by processing logic that comprises hardware (e.g., circuitry, dedicated logic, programmable logic, microcode, etc.), software (e.g., instructions run on a processing device to perform hardware simulation), or a combination thereof. The method 300 can determine the relative effectiveness of a video advertisement in different formats, such as skippable and non-skippable versions. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by ad effectiveness module 124, as shown in FIGS. 1 and 2.

Referring to FIG. 3, at block 310, method 300 determines a search lift value for each ad impression in a first format and for each ad impression in a second format. In one implementation, ad effectiveness module 124 compares the relevancy of user searches before and after a particular ad impression to determine if there was a search lift attributable to the ad impression. A search lift would indicate that the ad impression had an effect on the user that was reflected in the user's searches. Additional details of how the ad effectiveness module 124 determines the search lift value in some implementations are described below with respect to FIG. 4.

At block 320, method 300 determines an average search lift value for a group of ad impressions in the first format and for a group of ad impression in the second format. In one implementation, follow-on search module 210 determines a follow-on search score for each format of the advertisement based on the search lift values for each ad impression in that format. Follow-on search module 210 may calculate an average of those 200 search lift values, which may be referred to as the follow-on search score for the first format (e.g., non-skippable) of the advertisement. Follow-on search module 210 may also calculate the average of the search lift values from each ad impression of the second format (e.g., skippable) of the same advertisement. Follow-on search module 210 may store the follow-on search score from each format as follow-on search data 250.

At block 330, method 300 compares the average search lift values from the first format and from the second format to determine the relative effectiveness of each format of the advertisement. In one implementation, format comparison module 212 can compare the follow-on search values from follow-on search data 250 to measure the effectiveness of the varying advertisement formats. For example, if the follow-on search score for first format is significantly higher than the follow-on search score for the second format, this may indicate that the first format is more effective in reaching users. Also, if the follow-on search scores are similar across multiple formats, this may indicate that the particular format of the advertisement is not important in reaching users. Additional analysis of the follow-on search data 250 may also be performed by format comparison module 212, by other software programs, or by human analysts to measure the effectiveness of the advertisements.

Figure 4:
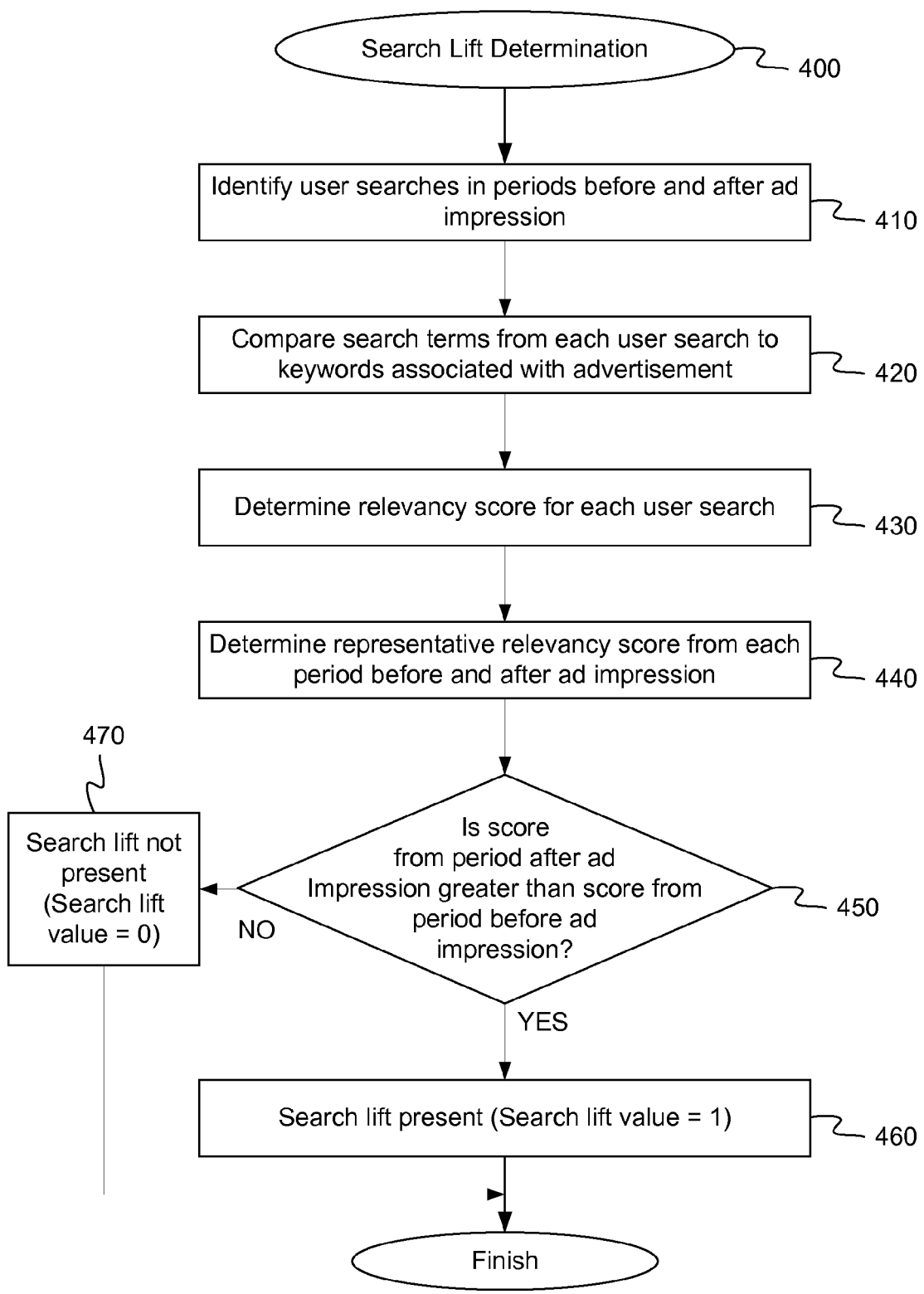
FIG. 4 is a flow diagram illustrating a method for determining a search lift attributable to an advertisement impression, according to some implementations.

FIG. 4 is a flow diagram illustrating a method for determining the search lift attributable to a particular ad impression, according to some implementations. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can determine the effectiveness of a particular ad impression based on the search behavior of a user before and after the ad impression. In one implementation, method 400 may be performed by ad effectiveness module 124, as shown in FIGS. 1 and 2.

Referring to FIG. 4, at block 410, method 400 identifies a number of user searches in periods before and after the ad impression. In one implementation, user search interface module 204 reviews logs of user search data to identify user search terms 244. In different implementations, user search interface module 204 reviews user searches from a set period of time (e.g., 12 hours) before and after a particular ad impression, from the same calendar day as the ad impression, or a set number (e.g., 20) of user search queries from before and after the ad impression. In one implementation, the user searches that are reviewed may be searches made specifically in web page 122. In other implementations, however, the searches may be from other web pages and/or websites accessed in web browser 112 or other programs. User search interface module 204 may store the identified searches as user search terms 244.

At block 420, method 400 compares the search terms from each user search to keywords associated with the advertisement. In one implementation, user search relevancy module 206 determines a relevancy score for each of the user searches identified at block 410. User search relevancy module 206 may compare the user search terms 244 from each separate search to the advertisement keywords 242 for a particular advertisement 134. In one implementation, user search relevancy module 206 looks for exact matches between the user search terms 244 and the advertisement keywords 242. In other implementations, however, user search relevancy module 206 may detect partial matches (e.g., based on the root of the keywords or to account for plurals).

At block 430, method 400 determines a relevancy score for each of the identified user searches based on the search terms and the keywords. User search relevancy module 206 may calculate a relevancy score based on what percentage of the advertisement keywords 242 are matched in a particular user search string. For example, if there are six advertisement keywords 242 describing the advertisement 134 and three of those keywords are found in the user search terms 244 for a particular search, the relevancy score for that search would be 50% or 0.50. User search relevancy module 206 may determine a relevancy score for each search identified by user search interface module 204 in the periods before and after the ad impression and store the relevancy scores as search relevancy data 246.

At block 440, method 400 determines a representative relevancy score from each period before and after the ad impression. In one implementation, search lift analysis module 208 determines a representative relevancy score from the period before the ad impression and from the period after the ad impression. In one implementation, the representative relevancy score may be the highest or maximum relevancy score from the period. In another implementation, the relevancy scores may be weighted based on their proximity in time to the ad impression. For example, the relevancy scores of searches occurring immediately after the ad impression may be weighted higher than searches occurring after some period of time. In other implementations, the representative relevancy score may be an average or a weighted average of the scores from the same period.

At block 450, method 400 determines if the representative score from the period after the ad impression is greater than the representative score from the period before the ad impression. In one implementation, search lift analysis module 208 may compare the representative relevancy score from the period before the ad impression to the representative relevancy score from the period after the ad impression to determine a search lift value. In one implementation the search lift value is a binary indicator of an increase in search relevancy after the ad impression. In another implementation, the representative relevance score must increase by a threshold amount (e.g., 25%) in order for search lift analysis module 208 to determine that search lift is present. In still other implementations, the search lift value may not be a binary indicator, but rather a percentage change in the representative relevancy scores. Search lift analysis module 208 may store the search lift value for each ad impression as search lift data 248 in data store 240.

If at block 450, method 400 determines that the representative score from the period after the ad impression is greater than the representative score from the period before the ad impression, at block 460, method 400 determines that search lift is present. In the case of a binary search lift value, search lift analysis module may set the search lift value equal to one. If at block 460, method 400 determines that the representative score from the period after the ad impression is not greater than the representative score from the period before the ad impression, at block 470, method 400 determines that search lift is not present. In the case of a binary search lift value, search lift analysis module may set the search lift value equal to zero. In one implementation, the search lift values for each impression may be combined and used to compare the effectiveness of different ad formats, as discussed above with respect to FIG. 3.

Figure 5:
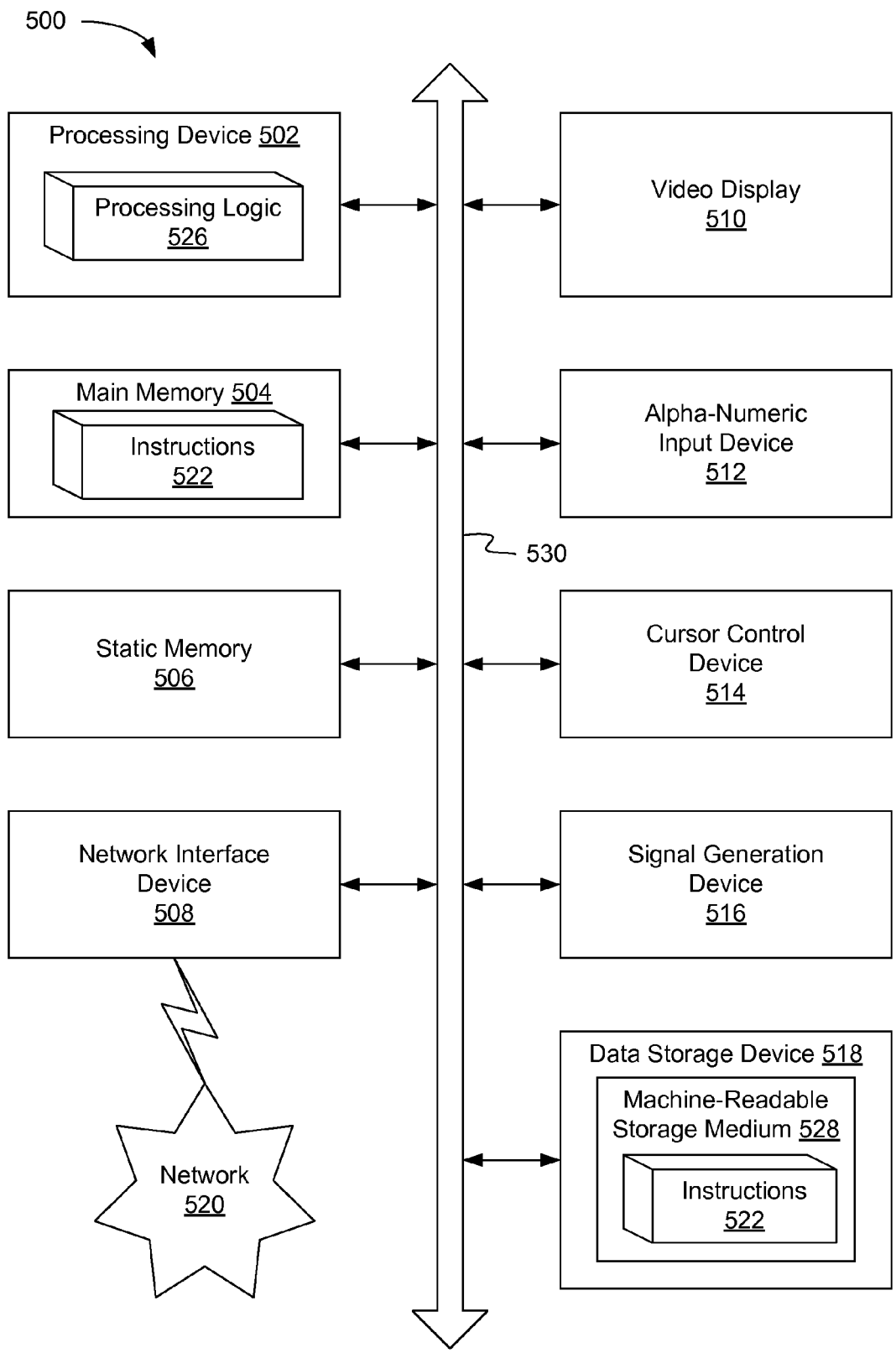
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 500 may be representative of a user device, such as user device 110, or of a server, such as web server 120, running ad effectiveness module 124 or media server 130.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for determining the effectiveness of an advertisement based on user search behavior, as described herein. While the machine-readable storage medium 528 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   determining, by a processing device, a first search lift value for a first impression of an advertisement, wherein the first impression of the advertisement is in a first format, and wherein the first search lift value is based on a relevancy of user searches before and after the first impression of the advertisement;
   determining, by the processing device, a second search lift value for a second impression of the advertisement, wherein the second impression of the advertisement is in a second format, and wherein the second search lift value is based on a relevancy of user searches before and after the second impression of the advertisement;
   determining, by the processing device, a third search lift value for a third impression of the advertisement, wherein the third impression of the advertisement is in the first format, and wherein the third search lift value is based on a relevancy of user searches before and after the third impression of the advertisement;
   determining, by the processing device, a fourth search lift value for a fourth impression of the advertisement, wherein the fourth impression of the advertisement is in the second format, and wherein the fourth search lift value is based on a relevancy of user searches before and after the fourth impression of the advertisement;
   calculating, by the processing device, a first average search lift value based on the first search lift value and the third search lift value, and a second average search lift value based on the second search lift value and the fourth search lift value; and
   comparing, by the processing device, the first average search lift value to the second average search lift value to determine an effectiveness of the first format and the second format.

2. The method of claim 1, wherein determining the first search lift value comprises:
   comparing search terms in a user search to one or more keywords associated with the advertisement to determine a relevancy score.

3. The method of claim 2, wherein the relevancy score comprises a percentage of the one or more keywords that are present in the search terms of the user search.

4. The method of claim 2, wherein determining the first search lift value comprises:
   determining a first representative relevancy score for user searches from a period before the first impression of the advertisement;
   determining a second representative relevancy score for user searches from a period after the first impression of the advertisement; and
   comparing the first representative relevancy score to the second representative relevancy score.

5. The method of claim 4, wherein the first representative relevancy score comprises a maximum relevancy score from the period before the first impression and the second representative relevancy score comprises a maximum relevancy score from the period after the first impression.

6. The method of claim 4, wherein determining the first search lift value further comprises:
   if the second representative relevancy score is greater than the first representative relevancy score, setting the first search lift value equal to a first representative value; and
   if the second representative relevancy score is not greater than the first representative relevancy score, setting the first search lift value equal to a second representative value.

7. The method of claim 1, wherein the first format comprises a non-skippable advertisement and the second format comprises a skippable advertisement.

8. A non-transitory machine-readable storage medium storing instructions which, when executed, cause a processing device to perform a method comprising:
   determining, by the processing device, a first search lift value for a first impression of an advertisement, wherein the first impression of the advertisement is in a first format, and wherein the first search lift value is based on a relevancy of user searches before and after the first impression of the advertisement;
   determining, by the processing device, a second search lift value for a second impression of the advertisement, wherein the second impression of the advertisement is in a second format, and wherein the second search lift value is based on a relevancy of user searches before and after the second impression of the advertisement;
   determining, by the processing device, a third search lift value for a third impression of the advertisement, wherein the third impression of the advertisement is in the first format, and wherein the third search lift value is based on a relevancy of user searches before and after the third impression of the advertisement;
   determining, by the processing device, a fourth search lift value for a fourth impression of the advertisement, wherein the fourth impression of the advertisement is in the second format, and wherein the fourth search lift value is based on a relevancy of user searches before and after the fourth impression of the advertisement;

calculating, by the processing device, a first average search lift value based on the first search lift value and the third search lift value, and a second average search lift value based on the second search lift value and the fourth search lift value; and comparing, by the processing device, the first average search lift value to the second average search lift value to determine an effectiveness of the first format and the second format.

9. The non-transitory machine-readable storage medium of claim 8, wherein determining the first search lift value comprises:

comparing search terms in a user search to one or more keywords associated with the advertisement to determine a relevancy score.

10. The non-transitory machine-readable storage medium of claim 9, wherein the relevancy score comprises a percentage of the one or more keywords that are present in the search terms of the user search.

11. The non-transitory machine-readable storage medium of claim 9, wherein determining the first search lift value comprises:

determining a first representative relevancy score for user searches from a period before the first impression of the advertisement;

determining a second representative relevancy score for user searches from a period after the first impression of the advertisement; and comparing the first representative relevancy score to the second representative relevancy score.

12. The non-transitory machine-readable storage medium of claim 11, wherein the first representative relevancy score comprises a maximum relevancy score from the period before the first impression and the second representative relevancy score comprises a maximum relevancy score from the period after the first impression.

13. The non-transitory machine-readable storage medium of claim 11, wherein determining the first search lift value further comprises:

if the second representative relevancy score is greater than the first representative relevancy score, setting the first search lift value equal to a first representative value; and if the second representative relevancy score is not greater than the first representative relevancy score, setting the first search lift value equal to a second representative value.

14. The non-transitory machine-readable storage medium of claim 8, wherein the first format comprises a non-skippable advertisement and the second format comprises a skippable advertisement.

15. A server computer system comprising:
a memory; and
a processing device, operatively coupled to the memory, to:
determine a first search lift value for a first impression of an advertisement, wherein the first impression of the advertisement is in a first format, and wherein the first search lift value is based on a relevancy of user searches before and after the first impression of the advertisement;

determine, a second search lift value for a second impression of the advertisement, wherein the second impression of the advertisement is in a second format, and wherein the second search lift value is based on a relevancy of user searches before and after the second impression of the advertisement;

determine a third search lift value for a third impression of the advertisement, wherein the third impression of the advertisement is in the first format, and wherein the third search lift value is based on a relevancy of user searches before and after the third impression of the advertisement;

determine a fourth search lift value for a fourth impression of the advertisement, wherein the fourth impression of the advertisement is in the second format, and wherein the fourth search lift value is based on a relevancy of user searches before and after the fourth impression of the advertisement;

calculate a first average search lift value based on the first search lift value and the third search lift value, and a second average search lift value based on the second search lift value and the fourth search lift value; and compare the first average search lift value to the second average search lift value to determine an effectiveness of the first format and the second format.

16. The server computer system of claim 15, wherein to determine the first search lift value, the processing device is to:

compare search terms in a user search to one or more keywords associated with the advertisement to determine a relevancy score.

17. The server computer system of claim 16, wherein the relevancy score comprises a percentage of the one or more keywords that are present in the search terms of the user search.

18. The server computer system of claim 16, wherein to determine the first search lift value, the processing device is to:

determine a first representative relevancy score for user searches from a period before the first impression of the advertisement;

determine a second representative relevancy score for user searches from a period after the first impression of the advertisement; and compare the first representative relevancy score to the second representative relevancy score.

19. The server computer system of claim 18, wherein the first representative relevancy score comprises a maximum relevancy score from the period before the first impression and the second representative relevancy score comprises a maximum relevancy score from the period after the first impression.

20. The server computer system of claim 18, wherein to determine the first search lift value, the processing device is to:

if the second representative relevancy score is greater than the first representative relevancy score, set the first search lift value equal to a first representative value; and if the second representative relevancy score is not greater than the first representative relevancy score, set the first search lift value equal to a second representative value.

21. The server computer system of claim 15, wherein the first format comprises a non-skippable advertisement and the second format comprises a skippable advertisement.

* * * * *